March 17, 1931.   L. HAMMOND   1,796,649
ALTERNATING CURRENT CLOCK
Filed Feb. 17, 1928

Inventor
Laurens Hammond
By Parker & Carter
Attorneys

Patented Mar. 17, 1931

1,796,649

UNITED STATES PATENT OFFICE

LAURENS HAMMOND, OF EVANSTON, ILLINOIS, ASSIGNOR, BY MESNE ASSIGNMENTS, TO THE HAMMOND CLOCK COMPANY, OF CHICAGO, ILLINOIS, A CORPORATION OF DELAWARE

ALTERNATING-CURRENT CLOCK

Application filed February 17, 1928. Serial No. 254,953.

This invention relates to an improvement in electric clocks which are operated from commercial alternating current and are driven by a non-self-starting synchronous motor of a well-known type.

Synchronous motors of this type consist essentially of a magnetic rotating member which carries salient magnetic poles and which is caused to revolve by the intermittent electromagnetic field of a stationary member positioned near the rotating element.

It has been my experience that such motors may be started by manual means with a little practice by turning the rotor forcibly at a definite speed, substantially synchronous speed. When launched at such speed the rotor will then continue to run as a synchronous motor. It is however my experience that such motors are somewhat difficult to start and that they are not always wholly reliable in continuing their operation on a commercial source of alternating current such as is distributed to homes for lighting purposes and the like. On such alternating current lines there are apt to be disturbances, such as inductive surges, irregular cycle disturbances, sudden drops or raising of the voltage, as well as harmonic frequencies above the fundamental or nominal frequency. The effect of such disturbances in general may be to cause hunting of the rotor, that is to say the tendency of the rotor to turn intermittently faster and slower than the true average synchronous speed. In some cases the rotor may hunt or oscillate in its speed to such an extent that it is thrown out of step and thereupon suddenly stops and comes to rest.

A clock built with such a motor may therefore be subject to annoying stoppages although the non-self-starting motor has many advantages for use in clocks of this type, owing to the fact that in a clock driven by a non-starting synchronous motor, the running of the motor is positive proof that the clock is showing correct time if said clock is on a well regulated circuit adapted to distribute time.

The object of my present invention is to produce a synchronous motor which is perfectly reliable in its operation and which cannot start from rest when alternating current is supplied to it, and yet will fall into synchronism if launched either manually or by auxiliary mechanical means at a speed which is very greatly in excess of synchronous speed or slightly above or below synchronous speed. A clock built with a motor of my improved type is very easy to launch manually, because any kind of spinning motion imparted to motor above a minimum amount will cause it immediately to start running in synchronism.

The type of motor herein referred to is one in which a revolving electric magnetic field need not and preferably does not exist. The magnetic field of the stationary member is merely an intermittent and alternating one, attracting successively the poles of the rotor, and producing torque through this means.

I illustrate my invention more or less diagrammatically in the accompanying drawings, wherein—

Like parts are indicated by like symbols throughout the specification and drawings.

Figure 1:
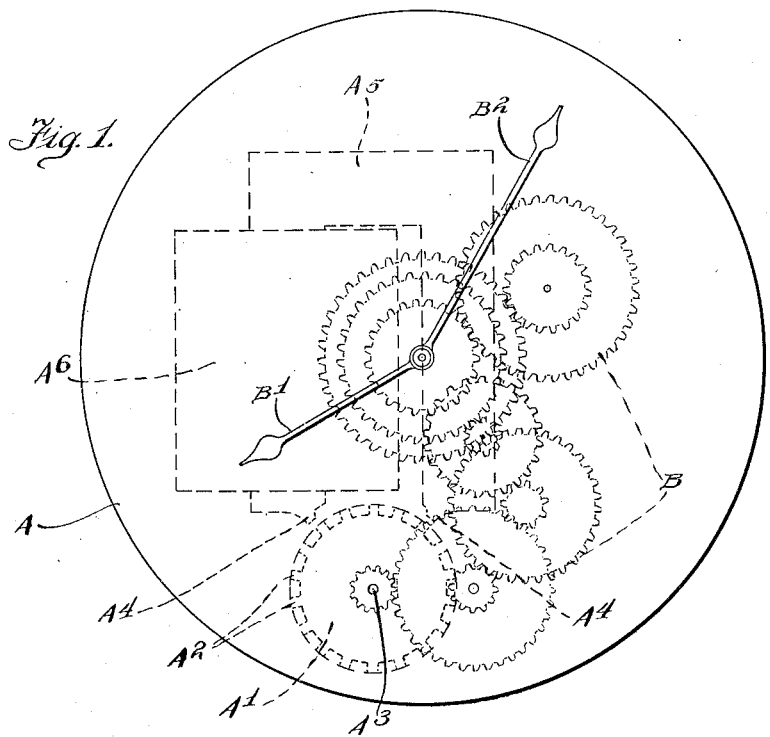
Figure 1 is a diagrammatic view of a clock.

Referring first to Figure 1, A generally indicates a clock mechanism having the rotating magnetic member $A^1$ with the salient pole pieces $A^2$. This member is mounted, and fixed against rotation, upon any suitable shaft or rotating member $A^3$. $A^4$ $A^4$ indicate stationary magnetic pole pieces upon the laminations $A^5$. $A^6$ indicates a coil in circuit with the alternating current delivered from the commercial power source by which the clock is actuated.

B, B, indicate any suitable chain of gears interposed between the rotor $A^1$ and the shaft $A^3$ and the hands of the clock $B^1$ $B^2$. It will be realized that any suitable clock face may be employed the details of which form no part of the present invention.

Figure 2:
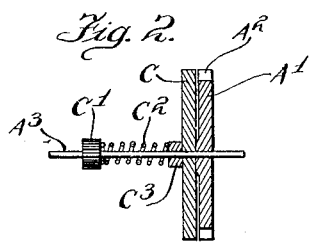
Figure 2 is a detailed view illustrating my control mechanism for bringing the rotor into synchronism subsequent to its launching at nonsynchronous speed.

Referring to Figure 2 C indicates a disc or washer, or any other suitable member which is mounted upon the shaft $A^3$ but which is not held against rotation in relation thereto. $C^1$ is a stop on said shaft $A^3$ and $C^2$ a coil spring interposed between said stop and an abutment member $C^3$ mounted upon or contacting the member C. In normal use of the device the spring $C^2$ tends to thrust the disc C against the rotor $A^1$. In response to the frictional engagement of the members $A^1$ and C, C normally rotates substantially in unison with $A^1$ although, in response to sudden changes in speed of the rotor $A^1$ on the shaft $A^3$, there may be a slippage or relative movement which relative movement, with the consequent performance of work and generation of heat and utilization of energy, effect the regulating function elsewhere herein described.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

My preferred construction includes a shaft upon which is rigidly mounted a rotating magnetic member having salient pole pieces which are successively attracted by stationary magnetic pole pieces, thereby producing effective torque, or maintaining rotation at synchronous speed. Mounted upon this shaft I also employ a fly wheel, or some member possessing inertia of rotation, which is free to turn on said shaft in either direction, but producing friction between said shaft and fly wheel in case of their relative rotation. If the fly wheel is made of proper dimensions, and the bearing surface upon which it may turn is properly proportioned, the natural friction of the weight of said member may be sufficient to obtain the desired result, although I prefer to employ some resilient means, such as a spring, to control the amount of friction existing between the fly wheel and the shaft or other revolving portions of the rotor.

The action of this combination of rotor and frictionally held fly wheel is most effective in practice and may be explained as follows. When the rotor is revolving at any uniform speed or at a speed very nearly uniform, the fly wheel revolves with the rest of the rotor and there is scarcely any displacement between the fly wheel and rotor. If the speed of the rotor is increased or decreased the inertia of the fly wheel causes it to slip on the shaft and the friction between it and the shaft constitutes energy dissipation, which work is done at the expense of any force of any kind tending to accelerate or retard the motion of the revolving unit as a whole.

Let us assume that this structure is manually launched and thereby caused to revolve at a speed greatly in excess of the normal synchronous running speed. In that event the natural friction on the bearings and from the load causes it to slow down gradually until the speed of the rotor approaches the normal running speed. When a certain point is reached the rotor will suddenly be violently retarded by the stationary magnetic members and if it were not for said frictional fly wheel member, would be retarded to a point below synchronous speed and would thereafter continue to slow up and stop. The frictional fly wheel however, when the sudden retarding action takes place, is retarded at a rate less than the retarding effect on the other portions of the rotor, and will damp the motion of the rotor in such a way as to permit it to continue running in synchronism.

Similarly the action of the loose fly wheel is to enable the rotor to fall into step and run synchronously from a speed considerably less than synchronous speed.

A rotor carrying the loose fly wheel cannot be made to hunt violently, as hunting of any kind means accelerated motion which causes work to be done between the fly wheel and the other revolving parts, which damps the oscillation.

In certain of the claims I employ the term "frictional." It will be realized that by such term I wish to mean the effect obtained, whereby relative movement of an inertia member or fly wheel in relation to the rotor or to the rotating part on which it is mounted results in the performance of work which absorbs the portion of the energy actuating the clock and thereby obtains the desired damping action.

I claim:

1. In a synchronous motor driven clock, the combination of varying magnetic flux producing means, a rotor shaft, a magnetic rotor secured to said shaft and adapted to be rotated by said means, a driving pinion secured to said shaft, an inertia member rotatable on said shaft, and a coil spring surrounding said shaft and compressed between said rotor and said pinion to hold said inertia member in frictional contact with one of said last named elements.

2. In a synchronous alternating current motor driven clock, the combination of a magnetic field producing means, a shaft, a rotor and a pinion secured to said shaft in spaced relation, an inertia member loosely mounted on said shaft between said pinion and said rotor, and a spring compressed between said inertia member and one of said last named elements and adapted to hold said member against the other of said elements.

Signed at Chicago, county of Cook, and State of Illinois, this 14th day of February, 1928.

LAURENS HAMMOND.